United States Patent
Kuromusha (10) Patent No.: US 9,970,571 B2
(45) Date of Patent: May 15, 2018

(54) PRESSURE CONTROL VALVE AND CONTROL VALVE

(71) Applicant: Shimadzu Corporation, Kyoto (JP)

(72) Inventor: Junya Kuromusha, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days. days.

(21) Appl. No.: 14/899,691

(22) PCT Filed: Jun. 20, 2013

(86) PCT No.: PCT/JP2013/066933
§ 371 (c)(1),
(2) Date: Dec. 18, 2015

(87) PCT Pub. No.: WO2014/203369
PCT Pub. Date: Dec. 24, 2014

(65) Prior Publication Data
US 2016/0131277 A1 May 12, 2016

(51) Int. Cl.
*F16K 31/12* (2006.01)
*F16K 47/08* (2006.01)
(Continued)

(52) U.S. Cl.
CPC ............ *F16K 47/08* (2013.01); *F16K 17/105* (2013.01); *G05D 16/106* (2013.01); *G05D 16/166* (2013.01)

(58) Field of Classification Search
CPC ..... F16K 17/105; F16K 47/08; G05D 16/106; G05D 16/166
(Continued)

(56) References Cited

U.S. PATENT DOCUMENTS 1,539,617 A * 5/1925 Williston ............... F16K 15/026
137/514
3,943,969 A * 3/1976 Rubin ..................... A01G 25/16
137/538
(Continued)

FOREIGN PATENT DOCUMENTS

JP 47-016706 B1 5/1972
JP 47-020891 B1 6/1972
(Continued)

OTHER PUBLICATIONS

International Search Report dated Jul. 16, 2013 from corresponding International Application No. PCT/JP2013/066933; 2 pgs.

*Primary Examiner* — Minh Le
(74) *Attorney, Agent, or Firm* — Maier & Maier, PLLC (57) ABSTRACT

A pressure control valve capable of preventing or suppressing the occurrence of the flaw that a pilot valve element which receives hydraulic pressure from a hydraulic fluid vibrates and hits a pilot valve seat member producing strange noise when the pilot valve element is in an opening state without resulting in an increase in number of components and assembling man-hours, the pressure control valve is provided with a main valve part containing a main valve element and a valve housing that includes a main valve seat on which the main valve element is able to be seated and a pilot chamber in which the main valve element is put in a slidable manner, and a pilot valve part containing a pilot valve element and a pilot valve seat member that includes a pilot valve seat on which the pilot valve element is able to be seated, the pilot valve element moving apart from the pilot valve seat to open when pressure in the pilot chamber exceeds a predetermined pressure.

5 Claims, 5 Drawing Sheets

(51) Int. Cl.
   *F16K 17/10*   (2006.01)
   *G05D 16/16*   (2006.01)
   *G05D 16/10*   (2006.01)

(58) Field of Classification Search
   USPC .... 137/490, 491, 489.3, 489.5, 488, 596.14, 137/512, 511, 514, 528, 601.2; 251/206, 251/325, 366, 282, 281
   See application file for complete search history.

(56) References Cited

U.S. PATENT DOCUMENTS

| | | | | |
|---|---|---|---|---|
| 4,075,296 A * | 2/1978 | Orsini | ............... | F02M 3/10 137/891 |
| 4,089,344 A * | 5/1978 | Flaschar | ............... | G05D 16/10 137/491 |
| 4,135,541 A * | 1/1979 | Lorimor | ............... | F16K 31/363 137/116.3 |
| 4,289,160 A * | 9/1981 | Kawasaki | ............... | F16K 17/105 137/491 |
| 4,476,890 A * | 10/1984 | Kawasaki | ............... | F16K 17/105 137/269 |
| 4,597,410 A * | 7/1986 | Wilke | ............... | F16K 17/105 137/491 |
| 5,036,881 A * | 8/1991 | Southmayd | ............... | E04H 4/14 137/533.29 |
| 5,240,036 A * | 8/1993 | Morris | ............... | F16K 15/063 137/514 |
| 5,396,924 A * | 3/1995 | Voss | ............... | F16K 17/046 137/491 |
| 5,400,817 A * | 3/1995 | Voss | ............... | F16K 17/046 137/491 |
| 6,745,792 B2 * | 6/2004 | Koo | ............... | F16K 17/105 137/491 |
| 6,986,362 B2 * | 1/2006 | Cheong | ............... | F15B 13/024 137/491 |
| 7,077,157 B2 * | 7/2006 | Cavagna | ............... | F16K 17/10 137/329.3 |
| 7,552,743 B1 * | 6/2009 | Achterman | ............... | F16K 1/12 137/460 |
| 7,591,282 B1 * | 9/2009 | Achterman | ............... | F16K 17/30 137/460 |
| 7,644,726 B1 * | 1/2010 | Achterman | ............... | F16K 1/12 137/498 |
| 8,365,763 B2 * | 2/2013 | Woelfges | ............... | F16K 17/105 137/491 |
| 8,375,981 B2 * | 2/2013 | Jeon | ............... | F16K 17/105 137/488 |
| 8,733,391 B2 * | 5/2014 | Jeon | ............... | F15B 13/024 137/488 |
| 2003/0131889 A1 * | 7/2003 | Kim | ............... | F16K 1/42 137/491 |
| 2013/0032225 A1 * | 2/2013 | Kim | ............... | F15B 13/024 137/489.5 |
| 2014/0223944 A1 * | 8/2014 | Dam | ............... | F25B 41/062 62/222 |

FOREIGN PATENT DOCUMENTS

| | | |
|---|---|---|
| JP | 48-008740 Y1 | 3/1973 |
| JP | 62-147002 A | 7/1987 |
| JP | 63-091763 U | 6/1988 |
| JP | 11-311349 A | 11/1999 |

* cited by examiner

Prior Art

PRESSURE CONTROL VALVE AND CONTROL VALVE

TECHNICAL FIELD

The present invention relates to a pressure control valve to be used in hydraulic circuits equipped on industrial vehicles or the like, and a control valve containing the pressure control valve as a component thereof.

BACKGROUND ART

Figure 6:
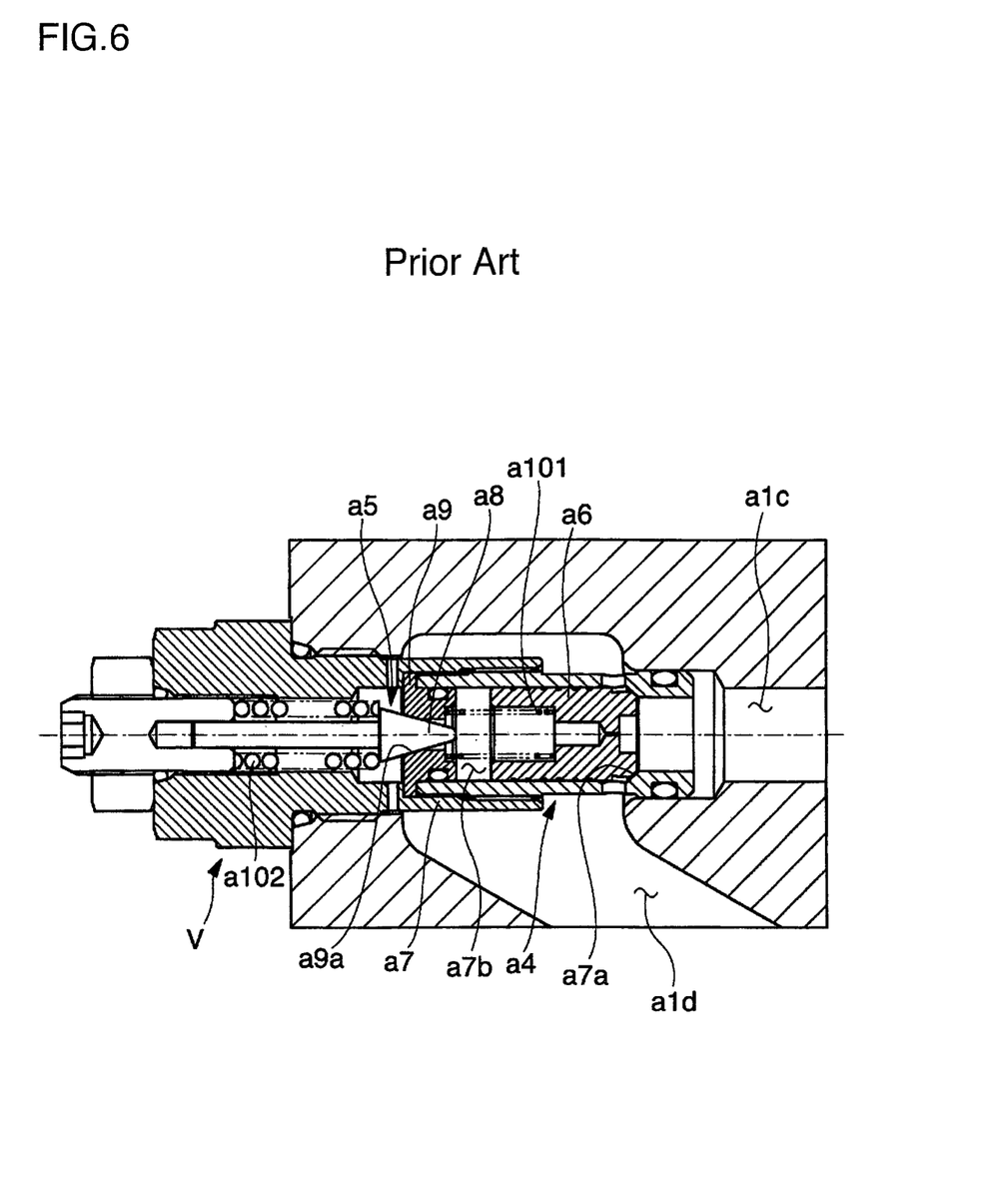
FIG. 6 is a schematic diagram showing a conventional pressure control valve.

Conventionally, as a pressure control valve to be used in hydraulic circuits equipped on industrial vehicles or the like, a balance piston type one described below with reference to FIG. 6 is known. This kind of pressure control valve V, which is provided between an input port a1c to receive a hydraulic fluid and a tank port a1d to communicate with a tank for holding the hydraulic fluid, contains a main valve part a4 constituted of a main valve element a6 and a valve housing a7 that includes a main valve seat a7a on which the main valve element a6 is able to be seated and a pilot chamber a7b in which the main valve element a6 is put in a slidable manner, and a pilot valve part a5 constituted of a pilot valve element a8 and a pilot valve seat member a9 that is fixed to the main valve part a4 and includes a pilot valve seat a9a on which the pilot valve element a8 is able to be seated. The main valve element a6 is pushed by a pushing means a101 so as to be seated on the main valve seat a7a, the pilot valve element a8 is pushed by a pushing means a102 so as to be seated on the pilot valve seat a9a. Hydraulic pressure in the input port a1c is applied to the pilot valve element a8 through the pilot chamber a7b while both of the main valve part a4 and the pilot valve part a5 are in a closing state.

When the hydraulic pressure in the input port a1c goes up above a predetermined pressure, the hydraulic pressure applied to the pilot valve element a8 exceeds the pushing force of the pushing means a102, the pilot valve element a8 moves apart from the pilot valve seat a9a so that the pilot valve part a5 becomes in an opening state. In this situation, since the inside of the pilot chamber a7b comes to communicate with the tank port a1d, differential pressure between the inside of the input port a1c and the inside of the pilot chamber a7b is generated. If force resulting from this differential pressure exceeds the pushing force of the pushing means a101, the main valve element a6 will also move apart from the main valve seat a7a so that the main valve part a4 becomes in an opening state.

Further, the hydraulic fluid flows in a gap formed between the pilot valve seat a9a of the pilot valve seat member a6 and the pilot valve element a8 while the pilot valve part a5 is in the opening state and the main valve part a4 is in the closing state. The center axis of the pilot valve seat a9a is not always coaxial with the center axis of the pilot valve element a8, and besides the moving direction of the pilot valve element a8 does not always agree with the extending direction of the center axis of the pilot valve element a8. Hence, there is a problem that such a flaw can occur that, when the pilot valve element a8 is eccentric with respect to the pilot valve seat a9a, the pilot valve element a8 vibrates by receiving the hydraulic pressure as the hydraulic fluid flows in the gap and hits the pilot valve seat member a9 generating strange noise.

As a configuration to solve this problem, it is possible to match the moving direction of a pilot valve element to the extending direction of the center axis of the pilot valve element and make the center axis of a pilot valve seat coaxial with the center axis of the pilot valve element by providing a guide body to hold the pilot valve element in a slidable manner (See Patent document 1, for example).

However, the configuration disclosed in the Patent document 1 such that a guide member is separately provided causes another trouble that number of components, assembling man-hours and manufacturing cost increase.

RELATED ART DOCUMENTS

Patent Documents

Patent document 1: Japanese Unexamined Patent Application Publication No. H11-311349.

SUMMARY OF THE INVENTION

Problems to be Solved by the Invention

The present invention has paid attention to the above circumstance, it is an object of the present invention to, without resulting in an increase in number of components and assembling man-hours, prevent or suppress the occurrence of the flaw that a pilot valve element which receives hydraulic pressure from a hydraulic fluid vibrates and hits a pilot valve seat member producing strange noise when a pilot valve part is in an opening state.

Means of Solving the Problems

In order to solve the above problem, the present invention employs the following configurations. That is, a pressure control valve according to the present invention comprises a main valve part containing a main valve element and a valve housing that includes a main valve seat on which the main valve element is able to be seated and a pilot chamber in which the main valve element is put in a slidable manner, and a pilot valve part containing a pilot valve element and a pilot valve seat member that includes a pilot valve seat on which the pilot valve element is able to be seated, the pilot valve element moving apart from the pilot valve seat to open when pressure in the pilot chamber exceeds a predetermined pressure, wherein the pilot valve element has a hydraulic fluid passage with a hydraulic fluid inlet that opens on a side close to the pilot chamber, three or more hydraulic fluid outlets that are formed toward the pilot valve seat on sides opposite to the side on which the hydraulic fluid inlet faces the pilot chamber, and channels from the hydraulic fluid inlet to the hydraulic fluid outlets arranged such that all the channels adjacent to each other are spaced by the same degrees.

With such configuration, while a part of the hydraulic fluid flows into a low pressure side through the hydraulic fluid passage of the pilot valve element, exerted force by hydraulic pressure of the hydraulic fluid generated in the hydraulic fluid passage has an only component along the center axis of the pilot valve element because the channels from the hydraulic fluid inlet to the hydraulic fluid outlets are arranged such that all the channels adjacent to each other are spaced by the same degrees. Therefore the occurrence of the flaw that the pilot valve element which receives the hydraulic pressure from the hydraulic fluid moves in an eccentric direction and hits the pilot valve seat member producing strange noise can be prevented or suppressed.

As a desirable configuration to enhance rectilinearity of the movement of the pilot valve element more, a mode can be cited such that a guide mechanism to guide the pilot valve element in a moving direction is provided between a top portion of the pilot valve element and the pilot valve seat member, and a restrictor is provided between the top portion of the pilot valve element and the pilot valve seat member.

As a configuration in which it is the easiest to form the hydraulic fluid passage in the pilot valve element, a mode can be cited such that there is the only hydraulic fluid inlet in the hydraulic fluid passage, and besides there is a diverging part at which the channels diverge toward the hydraulic fluid outlets in the hydraulic fluid passage.

Also, a control valve according to the present invention comprises at least a casing provided with an input port that opens to receive a hydraulic fluid and a tank port that opens to communicate with a tank for holding the hydraulic fluid, and the above pressure control valve provided between the input port and the tank port inside the casing.

Effects of the Invention

As described above, the present invention can prevent or suppress the occurrence of the flaw that the pilot valve element which receives hydraulic pressure from the hydraulic fluid vibrates and hits the pilot valve seat member producing strange noise when the pilot valve part is in the opening state without resulting in an increase in number of components and assembling man-hours.

MODE FOR CARRYING OUT THE INVENTION

Described below is a first embodiment of the present invention with reference to FIGS. 1 to 4.

Figure 1:
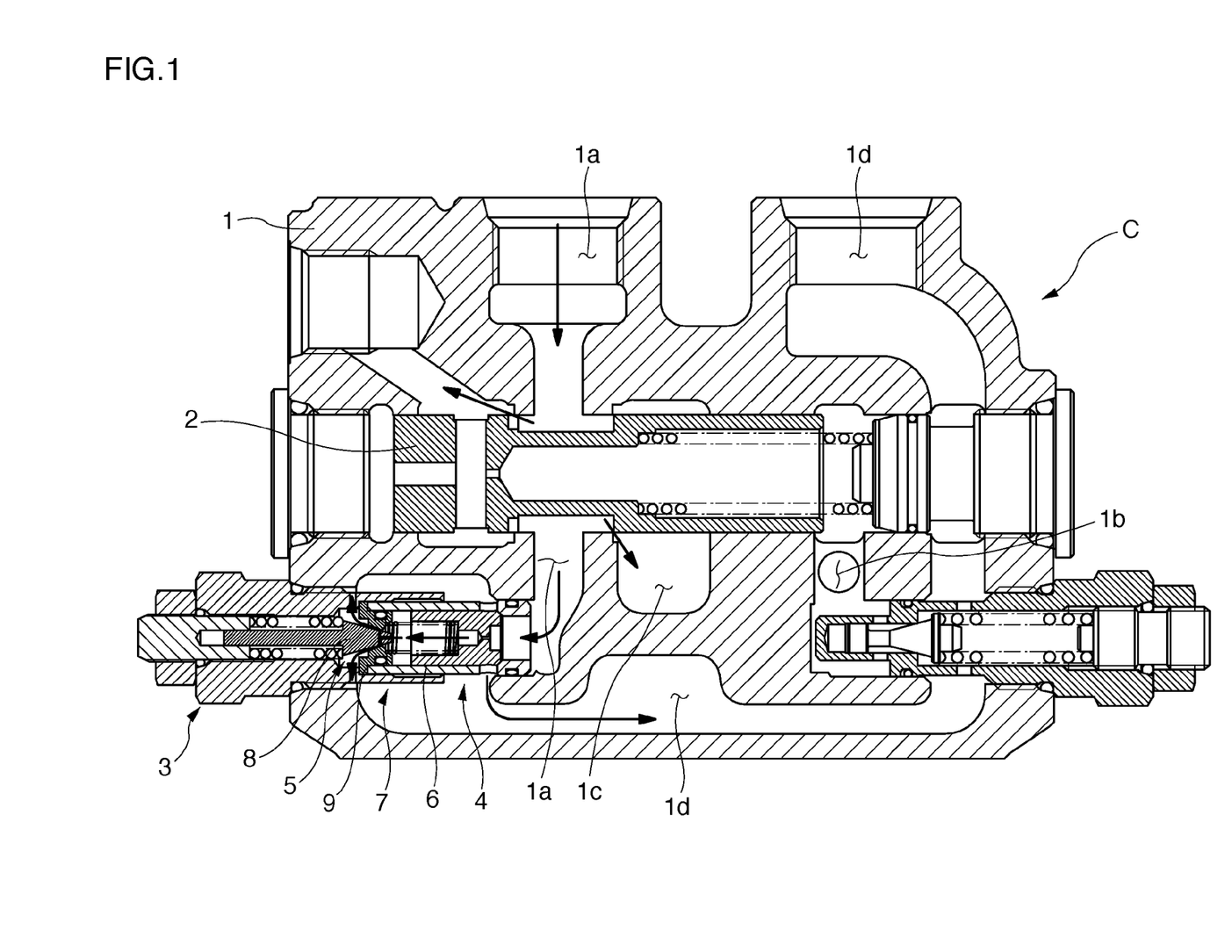
FIG. 1 is a schematic diagram showing a control valve according to a first embodiment of the present invention.

As shown in FIG. 1, a control valve C in this embodiment, which is used in a hydraulic system equipped on an industrial vehicle or the like, contains at least a casing 1, a flow dividing valve 2 installed in the casing 1, and a pressure control valve 3 according to the present invention installed in the casing 1. The casing 1 is provided with a hydraulic introduction port 1a as an input port that opens to introduce a hydraulic fluid, a passage for steering 1b that opens to deliver the hydraulic fluid to a hydraulic system for controlling a steering mechanism which is not illustrated, a passage for loading 1c to deliver the hydraulic fluid to a hydraulic system for controlling a loading apparatus which is not illustrated, and a low pressure passage 1d as a tank port that opens to communicate with a tank for holding the hydraulic fluid which is not illustrated. The flow dividing valve 2 is placed in a flow-dividing-valve-holding hole 1e communicating with the hydraulic introduction port 1a, the passage for steering 1b and the passage for loading 1c. The flow dividing valve 2 is to lead a part of the hydraulic fluid introduced from the hydraulic introduction port 1a to the passage for steering 1b through a communicating channel formed inside, and to lead the remainder of the hydraulic fluid introduced from the hydraulic introduction port 1a to the passage for loading 1c changing its aperture according to pressure in the hydraulic introduction port 1a. The pressure control valve 3 is placed between the hydraulic introduction port 1a and the low pressure passage 1d. The pressure control valve 3 is provided with a main valve part 4 and a pilot valve part 5.

Here, as described above, the hydraulic fluid introduced into the control valve C from the hydraulic introduction port 1a is divided between the passage for steering 1b and the passage for loading 1c via the flow dividing valve 2. On top of that, when the hydraulic pressure in the hydraulic introduction port 1a goes up above a predetermined pressure owing to an increase of pressure of the divided hydraulic fluid flowing into the passage for loading 1c and so on, the pilot valve part 5 opens first and the main valve part 4 opens next in the pressure control valve 3. Thereby the hydraulic fluid from the hydraulic introduction port 1a flows out into the low pressure passage 1d. That is, the pressure control valve 3 has the function of regulating the pressure in the hydraulic introduction port 1a so that it can be equal to or below the predetermined pressure. The specific configuration of this pressure control valve 3 will be described.

Figure 2:
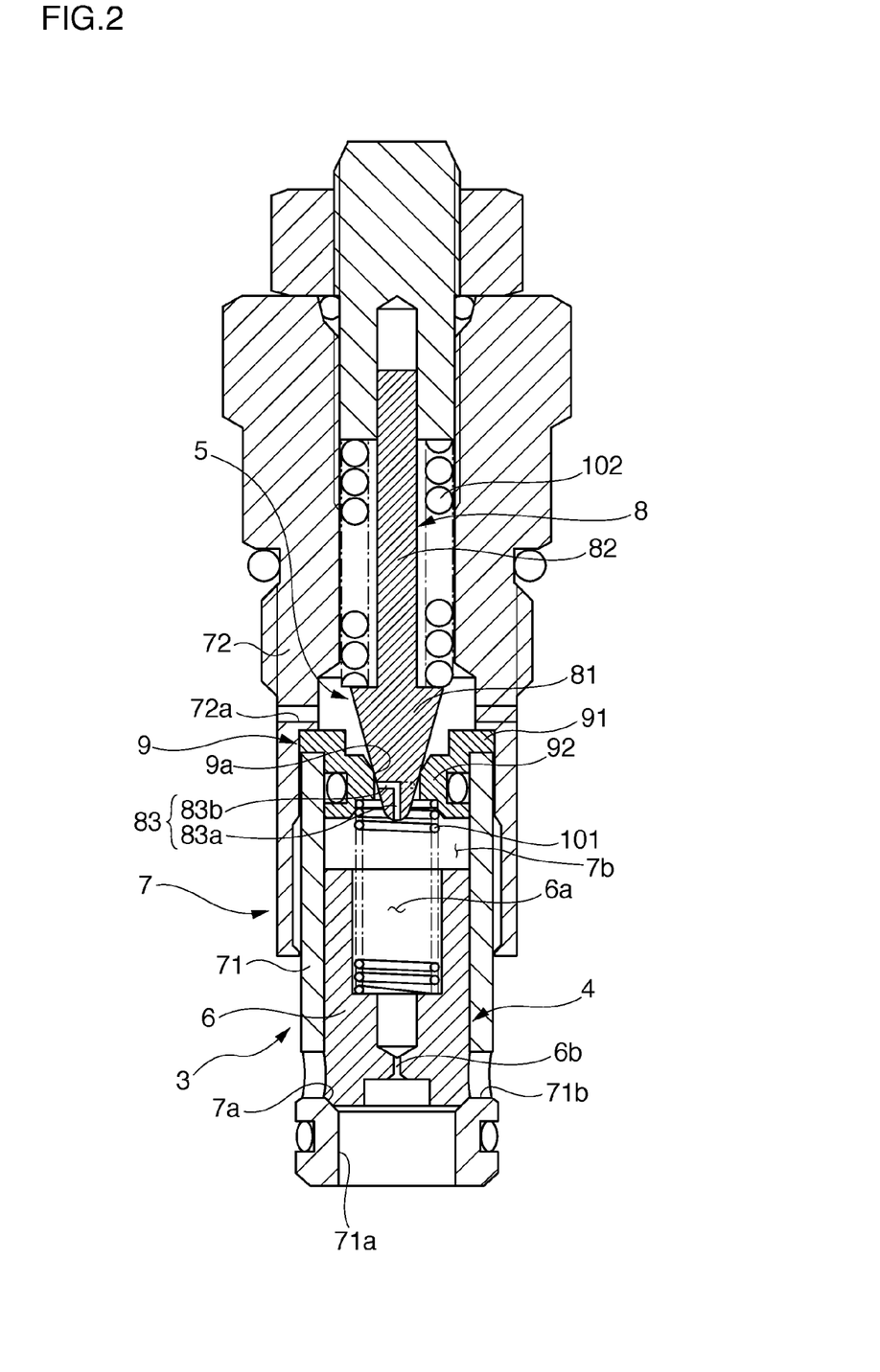
FIG. 2 is a schematic diagram showing a pressure control valve of the first embodiment.

As shown in FIG. 2, the pressure control valve 3 has the main valve part 4 constituted by a main valve element 6 and a valve housing 7 that includes a main valve seat 7a on which the main valve element 6 is able to be seated and a pilot chamber 7b in which the main valve element 6 is put in a slidable manner, and the pilot valve part 5 constituted by a pilot valve element 8 and a pilot valve seat member 9 that includes a pilot valve seat 9a on which the pilot valve element 8 is able to be seated. The pilot valve seat member 9 is fixed with a first sleeve 71 and a second sleeve 72. The pressure control valve 3 is provided between the hydraulic introduction port 1a and the low pressure passage 1d as described above. If the pilot valve part 5 and the main valve part 4 are in the opening state, the pressure control valve 3 will link the hydraulic introduction port 1a to the low pressure passage 1d, otherwise the pressure control valve 3 will obstruct between the hydraulic introduction port 1a and the low pressure passage 1d.

As described above and shown in FIG. 2, the main valve part 4 is constituted by the main valve element 6 and the valve housing 7 having the main valve seat 7a on which the main valve element 6 is able to be seated. The main valve element 6 is a member formed into a bottomed cylindrical shape that has an internal space 6a being open toward a side opposite to a side close to the main valve seat 7a and an orifice 6b to link the internal space 6a to the hydraulic introduction port 1a. On the other hand, the valve housing 7 includes the first sleeve 71 that is placed on a side close to the hydraulic introduction port 1a, and the second sleeve 72 that has one end part to hold a part of the first sleeve 71 and the other end part to be fit to the casing 1. The first sleeve 71 is a member formed into a cylindrical shape that has a hydraulic-fluid inflow port 71a to communicate with the hydraulic introduction port 1a in an end part toward the hydraulic introduction port 1a and first hydraulic-fluid outflow ports 71b to communicate with the low pressure passage 1d on its periphery, the pilot chamber 7b in which the main valve element 6 is able to slide is made inside the first sleeve 71. The main valve seat 7a is made at the end edge on the upstream side of the pilot chamber 7b. The second sleeve 72 is connected to the other end part opposite to the hydraulic-fluid inflow port 71a of the first sleeve 71 with screw engagement or the like, the second sleeve 72 holds the pilot valve element 8 of the pilot valve part 5 inside. Further, the second sleeve 72 has second hydraulic-fluid outflow ports 72*a* to link its internal space communicates to the low pressure passage 1*d*. The main valve part 4 can be selectably in a closing state where the main valve element 6 is seated on the main valve seat 7*a*, and the opening state where the main valve element 6 is apart from the main valve seat 7*a*. More specifically, a spring 101 as a pushing means to push the main valve element 6 toward the main valve seat 7*a* is provided between the bottom face of the internal space 6*a* in the main valve element 6 and the bottom face of the pilot valve seat member 9. When the pilot valve part 5 becomes in the opening state, differential pressure between the inside of the pilot chamber 7*b* and the passage for loading 1*c* is generated, force resulting from this differential pressure exerted on the main valve element 6 exceeds the pushing force of the spring 101, consequently the main valve part 4 becomes in the opening state.

Figure 3:
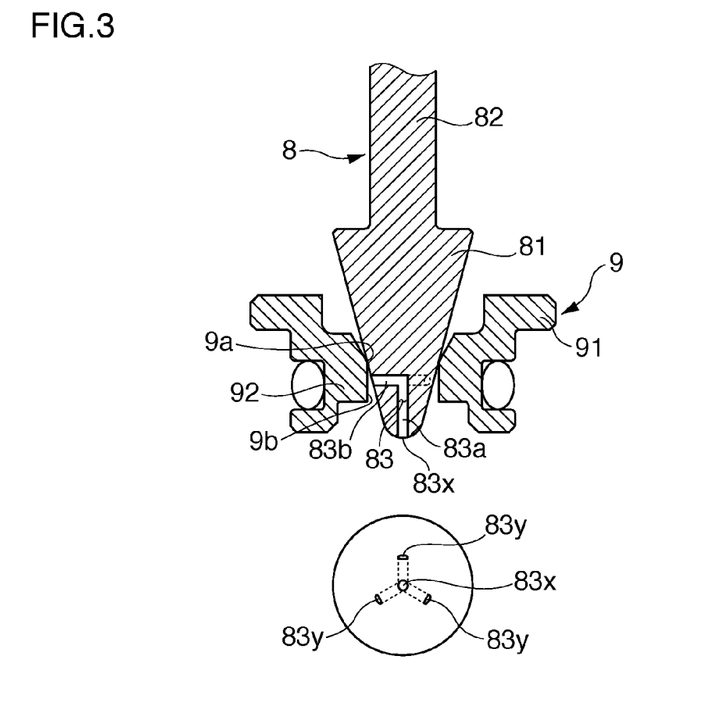
FIG. 3 is an enlarged view of a principal part of FIG. 2.

As described above and shown in FIG. 2, the pilot valve part 5 is constituted by the pilot valve element 8 capable of moving inside the second sleeve 72 of the valve housing 7 in the main valve part 4 and the pilot valve seat member 9 having the pilot valve seat 9*a* on which the pilot valve element 8 is able to be seated, the pilot valve seat member 9 being fixed between the first sleeve 71 and the second sleeve 72 of the valve housing 7 in the main valve part 4. The pilot valve element 8 includes a valve element body 81 formed into an approximately conic shape that reduces in diameter toward the hydraulic introduction port 1*a* and a guide portion 82 extending toward a side opposite to the side close to the hydraulic introduction port 1*a* to slide in the second sleeve 72. On the other hand, as shown in FIG. 3, the pilot valve seat member 9 includes a flange portion 91 to be placed between the first sleeve 71 and the second sleeve 72, a fitting portion 92 extending from the flange portion 91 toward the hydraulic introduction port 1*a* to be fitted into the first sleeve 71, and the pilot valve seat 9*a* at an end part on a side opposite to the side close to the hydraulic introduction port 1*a*. The pilot valve part 5 can be selectably in a closing state where the pilot valve element 8 is seated on the pilot valve seat 9*a*, and the opening state where the pilot valve element 8 is apart from the pilot valve seat 9*a*. More specifically, a spring 102 as a pushing means to push the pilot valve element 8 toward the pilot valve seat 9*a* is provided between the base end of the guide portion 82 of the pilot valve element 8 and the second sleeve 72. When the hydraulic pressure introduced into the pilot chamber 7*b* from the hydraulic introduction port 1*a* via the orifice 6*b* of the main valve element goes up above a predetermined pressure, force resulting from this hydraulic pressure exerted on the pilot valve element 8 exceeds the pushing force of the spring 102, consequently the pilot valve part 5 becomes in the opening state as shown in FIG. 4.

Moreover, according to this embodiment, a hydraulic fluid passage 83 having a hydraulic fluid inlet 83*x* that opens on a side close to the pilot chamber 7*b* and three hydraulic fluid outlets 83*y* that are set closer to the guide portion 82 of the pilot valve element 8 than the hydraulic fluid inlet 83*x* are provided in the valve element body 81 of the pilot valve element 8. The hydraulic fluid outlets 83*y* are formed to face a through hole 9*b* that extends from the pilot valve seat 9*a* toward the pilot chamber 7*b*. In detail, the hydraulic fluid inlet 83*x* of the hydraulic fluid passage 83 exists on the top of the pilot valve element 8. Also, the hydraulic fluid passage 83 has a head part 83*a* that extends from the hydraulic fluid inlet 83*x* along the center axis of the pilot valve element 8, and the end parts 83*b* that each extend from the end of the head part 83*a* to the hydraulic fluid outlets 83*y* along radial directions of the pilot valve element 8. The head part 83*a* and the end parts 83*b* intersect at right angles. The end of the head part 83*a*, or the start of the end parts 83*b*, corresponds to a diverging part in claim 4. Meanwhile, the mutually adjacent hydraulic fluid outlets 83*y* in the hydraulic fluid passage 83 are each separated by 120 degrees and extend radially from the end of the head part 83*a*. That is, the channels from the hydraulic fluid inlet 83*x* to the hydraulic fluid outlets 83*y* arranged such that all the channels adjacent to each other are spaced by the same degrees. In other words, the hydraulic fluid passage 83 takes the same position every time the pilot valve element 8 rotates about the center axis of the pilot valve element 8 by 120 degrees.

Figure 4:
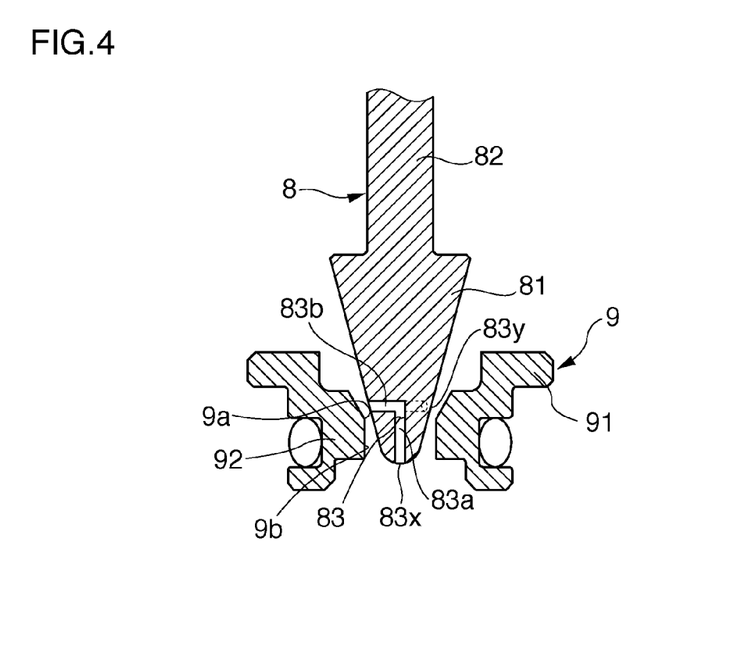
FIG. 4 is an explanatory diagram of the movement of the pressure control valve of the first embodiment.

When the hydraulic pressure in the hydraulic introduction port 1*a* goes up above the predetermined pressure, first, the force resulting from the hydraulic pressure applied to pilot valve element 8 exceeds the pushing force exerted on pilot valve element 8, the pilot valve element 8 moves apart from the pilot valve seat 9*a* so that the pilot valve part 5 becomes in the opening state as shown in FIG. 4. In this situation, a part of the hydraulic fluid is drained from the pilot chamber 7*b* into the low pressure passage 1*d* via the hydraulic fluid passage 83 and the hydraulic-fluid outflow ports 72*a*. That is, the hydraulic fluid flowing in the hydraulic fluid passage 83 flows out through the three hydraulic fluid outlets 83*y*. Now, since the three hydraulic fluid outlets 83*y* are spaced by 120 degrees, components of force resulting from the hydraulic pressure of the hydraulic fluid in directions perpendicular to the center axis of the pilot valve element 8 are balanced. Hence, exerted force by the hydraulic pressure of the hydraulic fluid has an only component along the center axis of the pilot valve element 8 when the pilot valve element 8 is in the opening state. Further, the hydraulic fluid in the pilot chamber 7*b* is drained into the low pressure passage 1*d* via the hydraulic-fluid outflow ports 72*a*, the differential pressure between the input port 1*a* and the inside of the pilot chamber 7*b* is generated, the force resulting from this differential pressure exceeds the pushing force of the pushing means 101 exerted on the main valve element 6, thereby the main valve element 6 moves apart from the main valve seat 7*a* so that the main valve part 4 becomes in the opening state.

According to this embodiment, since the pilot valve element 8 has the hydraulic fluid inlet 83*x* that opens on the side close to the pilot chamber 7*b* and the three hydraulic fluid outlets 83*y* that exist on the sides opposite to the pilot chamber 7*b*, and besides the channels from the hydraulic fluid inlet 83*x* to the hydraulic fluid outlets 83*y* arranged such that all the channels adjacent to each other are spaced by the same degrees, the exerted force resulting from the flow of the hydraulic fluid has the only component along the center axis of the pilot valve element 8 as described above. Therefore, without resulting in an increase in number of components and assembling man-hours owing to providing a special guide member to guide the pilot valve element 8 in the moving direction, the occurrence of the flaw that the pilot valve element 8 which receives the hydraulic pressure from the hydraulic fluid vibrates and hits the pilot valve seat member 9 producing strange noise can be prevented or suppressed.

In addition, according to this embodiment, since the hydraulic fluid outlets 83*y* are provided in three positions, the pilot valve element 8 can be stabilized the most based on mechanics by the hydraulic fluid flowing in the hydraulic fluid passage 83 while being guided in the moving direction.

Figure 5:
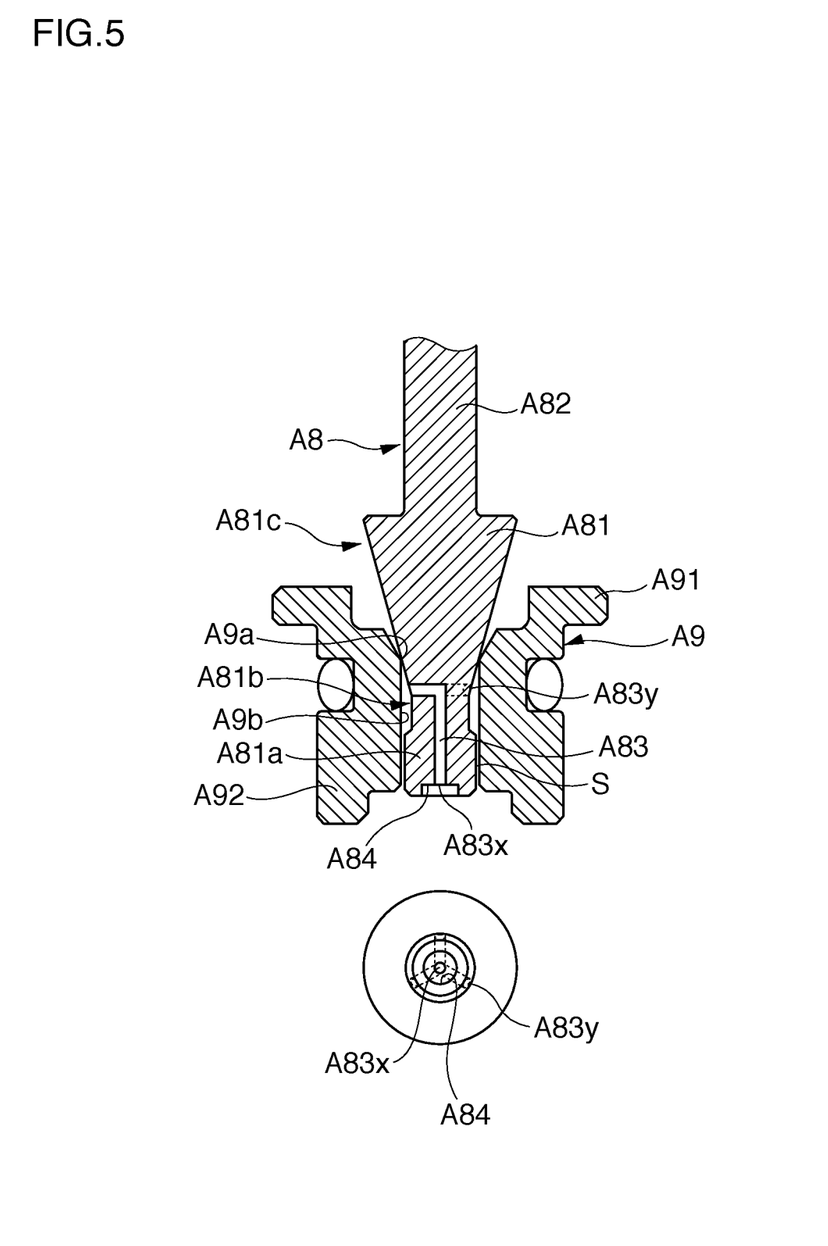
FIG. 5 is a schematic diagram showing a pressure control valve of a second embodiment of the present invention.

Next, described below is a second embodiment of the present invention with reference to FIG. 5. Differences from the above first embodiment will be mainly described. The elements that are equivalent to the ones described in the above first embodiment are given the same names and reference numerals thereas in the following exposition.

According to this embodiment, a valve element body A81 of a pilot valve element A8 has a shape as below. That is, the valve element body A81 includes a top portion A81a formed into an approximately cylindrical shape, a middle portion A81b slightly smaller in diameter than the top portion A81a, and a bottom portion A81c continuous with the middle portion A81b toward its bottom end, the a bottom portion A81c gradually expanding in diameter toward the bottom end. This valve element body A81 has a hydraulic fluid inlet A83x that opens on a side close to the pilot chamber 7b and three hydraulic fluid outlets A83y that are set closer to the guide portion 82 of the pilot valve element 8 than the hydraulic fluid inlet A83x too. The hydraulic fluid outlets A83y are formed to face a through hole A9b that extends from a pilot valve seat A9a toward the pilot chamber 7b. In detail, the hydraulic fluid inlet A83x of a hydraulic fluid passage A83 exists on the top of the pilot valve element A8. Also, the hydraulic fluid passage A83 has a head part A83a that extends from the hydraulic fluid inlet A83x along the center axis of the pilot valve element A8, and the end parts A83b that each extend from the end of the head part A83a to the hydraulic fluid outlets A83y along radial directions of the pilot valve element A8. The head part A83a and the end parts A83b intersect at right angles. The end of the head part A83a, or the start of the end parts A83b, corresponds to a diverging part in claim 4. Meanwhile, the mutually adjacent hydraulic fluid outlets A83y in the hydraulic fluid passage A83 are each separated by 120 degrees and extend radially from the end of the head part A83a. That is, the channels from the hydraulic fluid inlet A83x to the hydraulic fluid outlets A83y arranged such that all the channels adjacent to each other are spaced by the same degrees. In other words, the hydraulic fluid passage A83 takes the same position every time the pilot valve element 8 rotates about the center axis of the pilot valve element 8 by 120 degrees. In addition, according to the embodiment, a concave part surrounding the hydraulic fluid inlet A83x is provided, force resulting from the hydraulic pressure of the hydraulic fluid is exerted on the pilot valve element A8 in a state where the hydraulic fluid gets into the concave part A84.

On the other hand, the through hole A9b extending from the pilot valve seat A9a toward the pilot chamber 7b is provided in a pilot valve seat member A9. The top portion A81a of the valve element body A81 faces the through hole A9b as a slight gap S exists between them. That is, the through hole A9b and the top portion A81a of the valve element body A81 function as a guide mechanism to guide the pilot valve element A8 in a moving direction. Also, the gap S functions a restrictor to produce differential pressure between the pilot chamber 7b and the low pressure passage 1d side.

When the hydraulic pressure in the hydraulic introduction port 1a goes up above a predetermined pressure, first, the force resulting from the hydraulic pressure applied to the pilot valve element A8 exceeds the pushing force exerted on pilot valve element A8, the pilot valve element A8 moves apart from the pilot valve seat A9a so that the pilot valve part 5 becomes in the opening state. In this situation, a part of the hydraulic fluid is drained from the pilot chamber 7b into the low pressure passage 1d via the hydraulic fluid passage A83 and the hydraulic-fluid outflow ports 72a. That is, the hydraulic fluid flowing in the hydraulic fluid passage A83 flows out through the three hydraulic fluid outlets A83y.

Now, since the three hydraulic fluid outlets A83y are spaced by 120 degrees, components of force resulting from the hydraulic pressure of the hydraulic fluid in directions perpendicular to the center axis of the pilot valve element A8 are balanced. Hence, exerted force by the hydraulic pressure of the hydraulic fluid has an only component along the center axis of the pilot valve element A8 when the pilot valve element 8 is in the opening state. Further, the hydraulic fluid in the pilot chamber 7b is drained into the low pressure passage 1d via the hydraulic-fluid outflow ports 72a, differential pressure between the input port 1a and the inside of the pilot chamber 7b is generated, the force resulting from this differential pressure exceeds the pushing force of the pushing means 101 exerted on the main valve element 6, thereby the main valve element 6 moves apart from the main valve seat 7a so that the main valve part 4 becomes in the opening state.

According to this embodiment, since the pilot valve element A8 has the hydraulic fluid inlet A83x that opens on the side close to the pilot chamber and the three hydraulic fluid outlets A83y that exist on the sides opposite to the pilot chamber 7b, and besides the channels from the hydraulic fluid inlet A83x to the hydraulic fluid outlets A83y arranged such that all the channels adjacent to each other are spaced by the same degrees, the exerted force resulting from the flow of the hydraulic fluid has the only component along the center axis of the pilot valve element 8 as described above. Therefore, without resulting in an increase in number of components and assembling man-hours owing to providing a special guide member to guide the pilot valve element A8 in the moving direction, the occurrence of the flaw that the pilot valve element A8 which receives the hydraulic pressure from the hydraulic fluid vibrates and hits the pilot valve seat member A9 producing strange noise can be prevented or suppressed.

Also, since the guide mechanism to guide the pilot valve element A8 in the moving direction is provided between the top portion A81a of the pilot valve element A8 and the pilot valve seat member A9, rectilinearity of the movement of the pilot valve element A8 can be enhanced more.

Furthermore, since the gap S between the through hole A9b of the pilot valve seat member A9 and the top portion A81a of the valve element body A81 functions as the restrictor to produce the differential pressure between the pilot chamber 7b and the low pressure passage 1d, the state where the differential pressure between the pilot chamber 7b and the low pressure passage 1d can be maintained for a little while after the pilot valve element A8 moves apart from the valve seat A9a, the component of force resulting from the differential pressure along the center axis of the pilot valve element A8 can continue to be applied to the pilot valve element A8. Based on this aspect, the rectilinearity of the movement of the pilot valve element can be enhanced still more.

The present invention is not limited to the above-described embodiments.

For example, number of the hydraulic fluid outlets provided on the pilot valve element is not limited to three, four or more hydraulic fluid outlets may be provided.

The pressure control valve according to the present invention may not only be used in a hydraulic circuit equipped on an industrial vehicle or the like but also, for example, be independently used as a pressure relief valve in a hydraulic circuit to open when hydraulic pressure in a high pressure port exceeds a predetermined pressure.

Further, the present invention is not limited to the configurations, such as the above embodiments, in that there is one hydraulic fluid inlet in the hydraulic fluid passage and the hydraulic fluid passage branches off toward three hydraulic fluid outlets. For example, such configuration can be employed that the same number of hydraulic fluid inlets and hydraulic fluid outlets are provided, and besides the hydraulic fluid inlets, the hydraulic fluid outlets and channels to connect the hydraulic fluid inlets with the hydraulic fluid outlets are arranged so that all the hydraulic fluid inlets adjacent to each other, all the hydraulic fluid outlets adjacent to each other, or all the channels adjacent to each other are spaced by the same degrees.

Various other modifications are possible without departing from the scope and spirit of the present invention.

INDUSTRIAL APPLICABILITY

If the configurations according to the present invention is employed for a pressure control valve to be used in hydraulic circuits equipped on industrial vehicles or the like, and a control valve containing the pressure control valve as a component thereof, the occurrence of the flaw that the pilot valve element which receives hydraulic pressure from the hydraulic fluid vibrates and hits the pilot valve seat member producing strange noise when the pilot valve part is in the opening state can be prevented or suppressed without resulting in an increase in number of components and assembling man-hours.

DESCRIPTION OF THE REFERENCE NUMERAL

C control valve
1 casing
3 pressure control valve
4 main valve part
5 pilot valve part
6 main valve element
7 valve housing
8 pilot valve element
83 hydraulic fluid passage
83x hydraulic fluid inlet
83y hydraulic fluid outlet
9 pilot valve seat member

The invention claimed is:

1. A pressure control valve comprising:
a main valve part containing a main valve element and a valve housing that includes a main valve seat on which the main valve element is able to be seated and a pilot chamber in which the main valve element is put in a slidable manner; and
a pilot valve part containing a pilot valve element and a pilot valve seat member that includes a pilot valve seat on which the pilot valve element is able to be seated, the pilot valve element moves apart from the pilot valve seat to open when pressure in the pilot chamber exceeds a predetermined pressure,
wherein the pilot valve element has a hydraulic fluid passage with a hydraulic fluid inlet that opens on a side close to the pilot chamber, three or more hydraulic fluid outlets that are formed toward the pilot valve seat on sides opposite to the side on which the hydraulic fluid inlet faces the pilot chamber, and channels from the hydraulic fluid inlet to the hydraulic fluid outlets arranged such that all the channels adjacent to each other are spaced by the same degrees;
wherein the pilot valve element includes a valve element body formed into approximately conic shape, and wherein the hydraulic fluid passage is provided in the valve element body;
wherein a diameter of the valve element body that contacts the pilot valve seat in a closing state is larger than a diameter of a part of the valve element body in which the hydraulic fluid outlets are provided: and
wherein, in the closing state, the hydraulic fluid outlets are fluidly connected to the pilot chamber.

2. The pressure control valve according to claim 1, wherein a guide mechanism to guide the pilot valve element in a moving direction is provided between a top portion of the pilot valve element and the pilot valve seat member.

3. The pressure control valve according to claim 2, wherein a restrictor is provided between the top portion of the pilot valve element and the pilot valve seat member.

4. The pressure control valve according to claim 1, wherein there is the only hydraulic fluid inlet in the hydraulic fluid passage, and besides there is a diverging part at which the channels diverge toward the hydraulic fluid outlets in the hydraulic fluid passage.

5. A control valve comprising:
a casing provided with an input port that opens to receive a hydraulic fluid and a tank port that opens to communicate with a tank for holding the hydraulic fluid; and
a pressure control valve between the input port and the tank port inside the casing, the pressure control valve comprising a main valve part containing a main valve element and a valve housing that includes a main valve seat on which the main valve element is able to be seated and a pilot chamber in which the main valve element is put in a slidable manner, and a pilot valve part containing a pilot valve element and a pilot valve seat member that includes a pilot valve seat on which the pilot valve element is able to be seated, the pilot valve element moves apart from the pilot valve seat to open when pressure in the pilot chamber exceeds a predetermined pressure, wherein the pilot valve element has a hydraulic fluid passage with a hydraulic fluid inlet that opens on a side close to the pilot chamber, three or more hydraulic fluid outlets that are formed toward the pilot valve seat on sides opposite to the side on which the hydraulic fluid inlet faces the pilot chamber, and channels from the hydraulic fluid inlet to the hydraulic fluid outlets arranged such that all the channels adjacent each other are spaced by the same degrees;
wherein the pilot valve element includes a valve element body formed into an approximately conic shape, and wherein the hydraulic fluid passage is provided in the valve element body;
wherein a diameter of the valve element body that contacts the pilot valve seat in a closing state is larger than a diameter of a part of the valve element body in which the hydraulic fluid outlets are provided: and
wherein, in the closing state, the hydraulic fluid outlets are fluidly connected to the pilot chamber.

* * * * *